2,908,690
PRODUCTION OF PHTHALOCYANINE PIGMENTS

Joseph H. Cooper, Hillside, N.J., assignor to E. I. du Pont de Nemours and Company, Wilmington, Del., a corporation of Delaware No Drawing. Application November 29, 1955
Serial No. 549,883

8 Claims. (Cl. 260—314.5)

This invention relates to a new process for the manufacture of copper phthalocyanine pigments in beta crystal phase, and more particularly, it relates to an improved process for producing beta phase copper phthalocyanine pigments having markedly improved tinctorial strength and intensity.

It is well recognized in the prior art that many phthalocyanine pigments, and copper phthalocyanine in particular, may exist in two crystal phases. Although there is some confusion in the art with respect to the proper nomenclature of these two crystal phases, the nomenclature used herein corresponds to that used in FIAT Report 1313, volume 3, and in the U.S. Patent 2,556,726. In these publications the term "alpha phase" refers to the relatively reddish shade copper phthalocyanine such as may be obtained by acid pasting or simple salt milling, and the term "beta phase" refers to the much greener shade of copper phthalocyanine commonly obtained under the influence of certain solvents.

Both of these products have wide commercial use. However, the red shade, pure copper phthalocyanine suffers from a defect in that it may develop large crystals of the beta phase in the presence of certain solvents, thus resulting in a marked loss in strength. On the other hand, the greenish beta phase copper phthalocyanine is stable to crystal growth in the presence of solvents, but in the past it has invariably shown appreciably less tinctorial strength than the alpha phase.

The usual methods of manufacturing copper phthalocyanine result in products of relatively large crystal size which require some form of particle size reduction to have utility as pigments. Particle size reduction may be accomplished by dissolving the product in a relatively large amount of a strong acid, such as sulfuric acid, followed by precipitation of the pigment in a very fine particle size by rapidly diluting the acid solution with water. It is well recognized, however, that this process results in the red shade, alpha crystal modification. Likewise, simple salt milling following, for instance, the process shown in U.S. Patent 2,402,167, also results in the formation of the alpha phase.

A number of processes have been described for the preparation of the beta phase copper phthalocyanine, among which may be cited the acetone milling process of U.S. Patent 2,556,726 to Lane and the process of U.S. Patent 2,556,728 to Graham which discloses using a small amount of a solvent in a salt milling operation so that both particle size reduction and phase conversion occur at the same time.

Another process is disclosed in U.S. Patent 2,686,010. This process utilizes salt milling in the presence of anhydrous sodium ferrocyanide or anhydrous barium chloride at temperatures between 100 and 150° C.

Experience has demonstrated that the beta phase copper phthalocyanine continues to be appreciably weaker in tinctorial strength than the common grades of alpha phase copper phthalocyanine available in the trade, and in many cases, the intensity of the tints leaves something to be desired. It is also true that beta phase copper phthalocyanine pigments are markedly greener in hue than the alpha phase products, but there is considerable difference in this respect between products made by different processes.

In one important field of use for blue pigments, namely multicolor or process printing, relatively greenish blues of superior intensity (as contrasted with dullness) and high strength are required. Prior art pigments used in this field have been quite fugitive to light, e.g., the Peacock Blues, and the greenish beta phase phthalocyanine pigments have been considered as replacements. However, such phthalocyanines have not been quite green enough, nor bright enough, to replace the fugitive Peacock Blues without shading. Moreover, their strength has not been high enough to completely offset their high cost. Thus, a need for a greener, stronger, and more intense beta phase copper phthalocyanine has existed.

It is an object of this invention to prepare a copper phthalocyanine in beta crystal phase of markedly improved tinctorial strength and superior intensity over products heretofore available. It is a further object of this invention to provide a novel process for producing these improved beta crystal phase phthalocyanines.

It has now been found that if copper phthalocyanine is milled with an inert salt, such as sodium chloride, in the presence of a crystallizing solvent, such as tetrachloroethylene, at a temperature close to 120° C., products superior in strength and intensity to the prior art products are obtained.

In a preferred embodiment of this invention, a mixture of dry sodium chloride and copper phthalocyanine (such as might be obtained by reacting phthalic anhydride with a copper salt in the presence of a relatively large amount of urea and a suitable catalyst) is charged to a ball mill in such an amount that the mill will be slightly more than one-half full when the complete charge has been placed in it. The grinding medium in the ball mill is preferably a charge of "Cyl Pebs" which are cylindrical iron bars approximately one-half inch in diameter and one inch long. There is also added to the charge slightly more than one part of tetrachloroethylene for every six parts of crude pigment in the charge. The mill is then rotated under conventional ball mill grinding conditions while the charge is rapidly heated to about 120° C. by passing steam through the jacket of the mill. After milling for about 12 to 24 hours, the charge is removed from the mill and separated from the grinding medium. The salt and impurities from the grinding medium are extracted with a dilute aqueous acid which is near the boiling point. This extraction step and subsequent washing and drying will usually also remove the crystallizing solvent, but in instances where solvent removal is not complete, conventional separation means, such as steam distillation, may be used. From an economical point of view, a separate step of removing the crystallizing solvent may be preferred since it would permit easy recovery and reuse of the solvent. A product which is 100% in the beta phase is obtained. This product is about 15% stronger than prior art beta phase copper phthalocyanines, and it is markedly greener and more intense.

The following example sets forth this invention in more detail.

Example I

A ball mill with a diameter of about 24 inches and a total capacity of about 60 gallons is charged with 1,000 pounds of "Cyl Pebs" (cylindrical bars approximately one-half inch in diameter and one inch long). Six pounds (1 part) of a substantially chlorine-free crude copper phthalocyanine, which was made substantially in accordance with Example 1 of U.S. Patent 2,214,477, is then charged to the mill together with 52 pounds (8.65 parts) of dry sodium chloride. 1.15 pounds (.19 part) of tetrachloroethylene is also added to the mill, and then it is rotated at a speed of about 40 r.p.m. while steam is passed through the jacket of the mill to raise the temperature of the contents to about 120° C. The mill must be tightly sealed at this point to prevent any loss of the vaporized tetrachloroethylene, and rotation is continued with the temperature maintained close to 120° C. for about 24 hours. The dry powder is then discharged from the mill and separated from the "Cyl Pebs," and the salt and other impurities are extracted with about 50 gallons of 5% sulfuric acid at the boil. The pigment is isolated from the hot acid solution by filtering. It is then washed free of soluble salts and dried to give a bright blue powder. When examined by X-ray diffraction, this product is found to be completely in the beta phase.

A convenient method for testing the tinctorial strength of the pigment comprises dispersion in lithographic varnish in any convenient manner, as on a 3-roll ink mill or a Hoover muller, followed by dilution with a relatively large amount of a white pigment, such as zinc oxide, also dispersed in lithographic varnish. When tested in this manner, the product of this example exhibits about 15% more strength than a product made from the same crude copper phthalocyanine following the prior art. The product is also much greener and more intense than the prior art product.

If the procedure of the above example is modified by grinding for shorter periods, it is found that at the end of 12 hours the product is substantially equivalent to the prior art product. After 18 hours grinding, the strength is approximately 10% above that of the prior art with a marked improvement in greenness and intensity. Of course, the time of grinding will vary somewhat depending upon the size of the mill, the speed of rotation, the size of the charge and other factors. Good results are obtained if the grinding is continued until the pigment shows no further improvement in tinctorial strength. In a salt milling procedure of this type, anyone skilled in the art can determine the optimum time for a given set of conditions.

Although this invention finds its greatest application in the particle size reduction of chlorine-free copper phthalocyanine, metal-free and other metal phthalocyanines which are capable of existing in a beta crystal phase may be produced by the process of this invention. Therefore, this invention is applicable to the preparation of nickel phthalocyanine, zinc phthalocyanine and the metal-free derivative in a beta crystal phase. Furthermore, the process may be used for reducing the particle size of substituted copper phthalocyanines which are not known to exist in the beta crystal phase. In the case of these latter compounds no crystal phase conversion is involved in their particle size reduction.

The method of synthesis of the phthalocyanine pigments used in this process is not a critical factor in this invention. The process is applicable to any crude phthalocyanine pigment which requires particle size reduction, and it is particularly applicable to any crude phthalocyanine pigment which may be converted to the beta crystal phase.

Although sodium chloride is the preferred grinding salt because of its availability, low cost and relative inertness, any water or acid soluble inorganic salt which is neutral or alkaline in nature may be used. Examples include potassium chloride, anhydrous sodium sulfate, and sodium carbonate. Because of the elevated temperature of the process, one should not choose a salt which would react with the pigment at the operating temperatures. Certain hydrated salts are also to be avoided because the temperature of the operation may cause the release of some water of hydration and the free water may lead to caking. For this same reason, it is essential that the sodium chloride, which is the preferred agent, shall be entirely dry when it is charged to the mill.

A wide choice of crystallizing solvents is available for this invention. In a broad aspect, any anhydrous organic solvent having a boiling range which is high enough to withstand the heat of grinding without substantial volatilization, and at the same time which is low enough to permit its removal by steam distillation is suitable. A practical boiling range which meets these requirements is from about 50–220° C. Examples of suitable crystallizing solvents include tetrachloroethylene, which is preferred, xylene, methyl chloroform, sym. tetrachloroethane, p-dichlorobenzene, o-dichlorobenzene, nitrobenzene, kerosene, carbon tetrachloride, trichlorobenzene and pinene. Hydrocarbons and chlorinated hydrocarbons boiling between 50–220° C. are especially suitable.

The ratio of solvent to pigment in parts by weight should be not less than about 15 parts of solvent per 100 parts of pigment (15% of the weight of the pigment), and the preferred range of solvent is from about 18 parts to about 30 parts per 100 parts of pigment. As the solvent is increased much beyond this point, there is a tendency for some reduction in the ultimate strength of the finished product, and amounts of solvent significantly in excess of 100 parts per 100 parts of pigment are highly undesirable. The absolute upper limit is that point at which there is evidence of wetness in the grinding mass.

The optimum amount of salt to pigment in parts by weight is about 9 to 1, but the amount may vary from as little as 4 parts of salt per part of pigment to as much as 15 or 20 parts of salt per part of pigment. In the lower range, there is a tendency for weakness in the resulting product, while in the upper part of the range the capacity of the mill is markedly reduced without any compensating improvement in the quality of the resulting product. The extraction of the salt after the milling operation may be accomplished by conventional separation means which are known in the art.

Variations in the temperature of the grinding charge have demonstrated that about 120° C. gives the best results. Increasing the temperature significantly above this point results in a tendency to lower strength, and temperatures above about 140° C. are considered unsatisfactory. On the other hand, temperatures significantly below 120° C. result in markedly lengthening the time required to obtain the desired advantages so that the effective range for the purposes of this invention should be from 100° C. to about 140° C.

The specific example used "Cyl Pebs" rather than balls in the milling operation, but other shaped objects may be used as the grinding aid, such as balls, pebbles or nails. The term, ball milling operation, is not restricted to the use of balls as the grinding aid. It covers any grinding in a ball mill regardless of the shape of the grinding aid.

This invention makes possible preparation of a high strength beta phase copper phthalocyanine of superior greenness and superior intensity by a process which offers economic advantages over the prior art. Furthermore, the novel process claimed herein is considered to require a shorter grinding cycle than prior art processes which use elevated temperatures.

I claim:

1. In a process for producing a phthalocyanine pigment in the beta crystal phase by salt milling in the presence of a crystallizing solvent, the improvement which comprises salt milling a phthalocyanine capable of existing in the beta crystal phase at temperatures ranging from 100–140° C., and in the presence of a crystallizing solvent in an amount which permits the grinding mass to retain the characteristics of dry powder and above 15% based on the weight of the phthalocyanine, removing the salt and the crystallizing solvent, and recovering the phthalocyanine pigment in the beta crystal phase.

2. In a process for producing a phthalocyanine pigment in the beta crystal phase by salt milling in the presence of a crystallizing solvent, the improvement which comprises salt milling a phthalocyanine capable of existing in the beta crystal phase at temperatures ranging from 100-140° C. and in the presence of a crystallizing solvent selected from the group consisting of nitrobenzene, hydrocarbons and chlorinated hydrocarbons boiling between 50-220° C. in an amount which permits the grinding mass to retain the characteristics of dry powder and above 15% based on the weight of the phthalocyanine, removing the salt and the crystallizing solvent, and recovering the phthalocyanine pigment in the beta crystal phase.

3. The process of claim 2 in which the phthalocyanine is copper phthalocyanine, the salt is sodium chloride, and the crystallizing solvent is tetrachloroethylene.

4. In a process for producing a phthalocyanine pigment in the beta crystal phase by salt milling in the presence of a crystallizing solvent, the improvement which comprises salt milling one part by weight of a phthalocyanine capable of existing in the beta crystal phase with from 4-20 parts by weight of an inorganic salt selected from the group consisting of water soluble neutral salts, acid soluble neutral salts, water soluble alkaline salts, and acid soluble alkaline sats, at temperatures ranging from 100-140° C. and in the presence of from .15-1 part by weight of a crystallizing solvent selected from the group consisting of nitrobenzene, hydrocarbons and chlorinated hydrocarbons boiling between 50 and 220° C., removing the salt and the crystallizing solvent, and recovering the phthalocyanine pigment in the beta crystal phase.

5. The process of claim 4 in which the phthalocyanine is copper phthalocyanine, the salt is sodium chloride, and the crystallizing solvent is tetrachloroethylene.

6. In a process for producing phthalocyanine pigment in the beta crystal phase by salt milling in the presence of a crystallizing solvent, the improvement which comprises grinding in a ball milling operation for from 12-24 hours at temperatures ranging from 100-140° C., one part by weight of a phthalocyanine capable of existing in the beta crystal phase with about 9 parts by weight of a salt selected from the group consisting of water soluble neutral salts, acid soluble neutral salts, water soluble alkaline salts, and acid soluble alkaline sats, and in the presence of from .18-.3 part by weight of a crystallizing solvent selected from the group consisting of nitrobenzene, hydrocarbons and chlorinated hydrocarbons boiling between 50-220° C., removing the salt and the crystallizing solvent, and recovering the phthalocyanine pigment in the beta crystal phase.

7. The process of claim 6 in which the phthalocyanine is copper phthalocyanine, the salt is sodium chloride, and the crystallizing solvent is tetrachloroethylene.

8. In a process for producing copper phthalocyanine in the beta crystal phase by salt milling in the presence of a crystallizing solvent, the improvement which comprises grinding in a ball milling operation for from 12-24 hours at a temperature of about 120° C., 1 part by weight of copper phthalocyanine with 8.65 parts by weight of sodium chloride, and in the presence of .19 part by weight of tetrachloroethylene, removing the sodium chloride and the tetrachloroethylene after completion of the ball milling operation, and recovering copper phthalocyanine pigment in the beta crystal phase.

References Cited in the file of this patent

UNITED STATES PATENTS

| | | |
|---|---|---|
| 2,402,167 | Lang et al. | June 18, 1946 |
| 2,556,727 | Lane et al. | June 12, 1951 |
| 2,556,728 | Graham | June 12, 1951 |
| 2,556,729 | Stallman | June 12, 1951 |
| 2,723,981 | Tullsen | Nov. 15, 1955 |